(12) United States Patent
Crowden

(10) Patent No.: US 7,572,308 B2
(45) Date of Patent: Aug. 11, 2009

(54) MECHANICAL SYSTEM FOR INSTALLING AND REMOVING CONTACTING DEVICES FROM A CHEMICAL PROCESS TOWER

(75) Inventor: John Crowden, Tsawassen (CA)

(73) Assignee: Noram Engineering and Constructors Ltd., Vancouver (CA)

( * ) Notice: Subject to any disclaimer, the term of this patent is extended or adjusted under 35 U.S.C. 154(b) by 793 days.

(21) Appl. No.: 11/222,825

(22) Filed: Sep. 12, 2005

(65) Prior Publication Data

US 2006/0057041 A1 Mar. 16, 2006

Related U.S. Application Data

(60) Provisional application No. 60/608,363, filed on Sep. 10, 2004.

(51) Int. Cl.
*B01D 46/42* (2006.01)

(52) U.S. Cl. .................... 55/350.1; 55/478; 55/484; 95/273

(58) Field of Classification Search ............... 55/350.1, 55/484, 502, 508, 523, 493; 95/273
See application file for complete search history.

(56) References Cited

U.S. PATENT DOCUMENTS

| | | | | | |
|---|---|---|---|---|---|
| 1,835,093 | A | * | 12/1931 | Ruemelin | .................... 55/305 |
| 4,266,956 | A | * | 5/1981 | Revell | .................... 55/478 |
| 5,536,284 | A | * | 7/1996 | Puttaert | .................... 55/302 |
| 5,746,796 | A | * | 5/1998 | Ambs et al. | .................... 55/493 |
| 5,752,999 | A | * | 5/1998 | Newby et al. | .................... 55/350.1 |
| 5,961,696 | A | * | 10/1999 | Gombos | .................... 95/273 |
| 2002/0020160 | A1 | * | 2/2002 | Moore | .................... 55/484 |
| 2006/0207230 | A1 | * | 9/2006 | DeMarco | .................... 55/319 |

* cited by examiner

*Primary Examiner*—Duane Smith
*Assistant Examiner*—Minh-Chau T Pham
(74) *Attorney, Agent, or Firm*—Oyen Wiggs Green & Mutala LLP

(57) ABSTRACT

An apparatus for installing and removing candles from a packed tower comprises a rail or series of rails attached to the inside of the top of the vessel. The rail(s) may be supported from either the roof or walls of the tower. A traveler assembly is supported on the rail(s). The traveler assembly supports a hoist puller that in turn raises and lowers the candles. The rail(s) may be located such that they extend over the centerlines of each of the candle locations, and each such that a portion of each rail passes under the candle installation port. Multiple traveler assemblies may be used to increase the speed of installation. The traveler assembly may be configured to be removed when not in use, to ensure it is not exposed to the harsh environment in the tower. Alternatively, the traveler assembly may be constructed from corrosion-resistant materials, so that the traveler assembly may be left in the tower.

15 Claims, 4 Drawing Sheets

MECHANICAL SYSTEM FOR INSTALLING AND REMOVING CONTACTING DEVICES FROM A CHEMICAL PROCESS TOWER

REFERENCE TO RELATED APPLICATION

This application claims priority from U.S. provisional patent application 60/608,363, filed on 10 Sep. 2004.

TECHNICAL FIELD

The invention relates to installation of devices in chemical plant towers, and particularly to the installation of candle type mist eliminators in packed towers.

BACKGROUND

In chemical plants, towers may be used to perform a process operation on a stream of gas and/or liquid. The process operation can include quenching, absorption, or stripping of one or more chemical components. When the stream leaving the process tower is in the gas phase, frequently a contacting device is installed to remove liquid entrainment from the exiting gas.

In a packed tower mist elimination is often achieved with the use of a contacting device comprised of glass-fiber material. Some such contacting devices are tall and cylindrical in shape and consequently referred to as "candles". For example, in the sulfuric acid industry, liquid entrainment is commonly removed in sulfuric acid absorption towers and in drying towers using such candle filters.

The quantity of candles in a tower varies but can be up to fifty with candle heights of up to twenty feet. The candles are connected to a support within the tower. The support may be a plate known as a tubesheet. The candles are bolted either directly to the tubesheet, or are bolted to flanges which are raised up from the tubesheet. A gasket is typically placed between each candle and its supporting flange or tubesheet to ensure a good seal. Any leaks at this connection can significantly reduce the performance of the tower. The candles may either stand on or hang from the flanges or the tubesheet.

During installation, the candles are typically lowered into the top of the tower with a crane. They enter through one or more ports on the top of tower. FIG. 1 schematically illustrates a tower 10 with a candle 20 being installed therein according to the prior art. Tower 10 comprises a generally cylindrical housing 12 with a gas exit nozzle 14 located in an upper end thereof along the centerline 15 of housing 12. In the example illustrated in FIG. 1, a liquid outlet nozzle 2, gas inlet nozzle 5 with brick lining 4, packing support 6, packing 7 and distributor 8 are located in a lower portion of tower 10.

A candle installation port 16 is defined in the upper end of housing 12, located off centerline 15. Candle flanges 18 are located inside housing 12 at a plurality of locations for supporting candles 20. Flanges 18 may have gaskets (not shown) thereon for forming seals with candles 20. A candle 20 is suspended from a crane (not shown) by eyelet 21 and lowered through port 16 until it rests on flanges 18. Candle 20 is then manually shifted by workers (not shown), as indicated by reference numeral 20', until candle 20 is in its final position, as indicated by reference numeral 20". This process is reversed when candle 20 is removed.

The candle weights range from up to 500 pounds when dry and can increase to over 1500 pounds when wet after use. As one skilled in the art will appreciate, the weight and awkward shape of candles 20 makes it difficult to align candles 20 for bolting to the gaskets. Also, the manual shifting process may lead to damage of the candles, gaskets, or supporting flange or tubesheet. Furthermore, a gas-tight seal may not be realized between a candle and the flange or tubesheet if the candle is not properly aligned, or if any damage to the candle, gasket, flange or tubesheet has occurred. A damaged candle or ineffective seal results in poor tower performance characterized by high liquid entrainment in the gases exiting from nozzle 14.

Installation and removal of the heavy candles may also result in injuries to maintenance personnel. In addition to the increased weight, wet candles must sometimes be removed by specialized workers in cumbersome acid proof suits, since the environment inside tower 10 can be highly corrosive.

The size of the housing in which the candles are located is usually minimized for economic reasons. FIG. 1A illustrates an example arrangement of candles 20 within housing 12. The confined space adds to the difficulty of installing and removing the candles.

It is known to add extra candle installation ports to the housing of the tower in an attempt to make installation easier by reducing the distance by which the candles must be manually shifted. However, the extra installation ports add to the fabrication cost of the tower.

There exists a need for an improved method and apparatus for installation and removal of candles in and from towers.

SUMMARY OF THE INVENTION

The invention provides a safe and secure system for installation and removal of equipment in towers. Benefits of the system may include improved tower performance, reduced emissions, increased safety for maintenance personnel, reduced maintenance costs and reduced fabrication and shipping costs.

One aspect of the invention provides an apparatus for installing and removing contacting devices such as candles from a packed tower. The apparatus comprises a rail or series of rails attached to the inside of the top of the vessel. The rail(s) may be supported from either the roof or walls of the tower. A traveler assembly is supported on the rail(s) which includes means for raising and lowering the candles. The traveler assembly may comprise a hoist puller that raises and lowers the candle. The rail(s) may be located such that the rail(s) extend above the centerlines of each of the candle locations, and such that a portion of each rail passes under the candle installation port. Multiple traveler assemblies may be used to increase the speed of installation. The traveler assembly may be configured to be removed when not in use, to ensure that the traveler is not exposed to the harsh environment in the tower. Alternatively, the traveler assembly may be constructed from corrosion-resistant materials, so that the traveler assembly may be left in the tower.

In addition to the exemplary aspects and embodiments described above, further aspects and embodiments will become apparent by reference to the drawings and by study of the following detailed descriptions.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
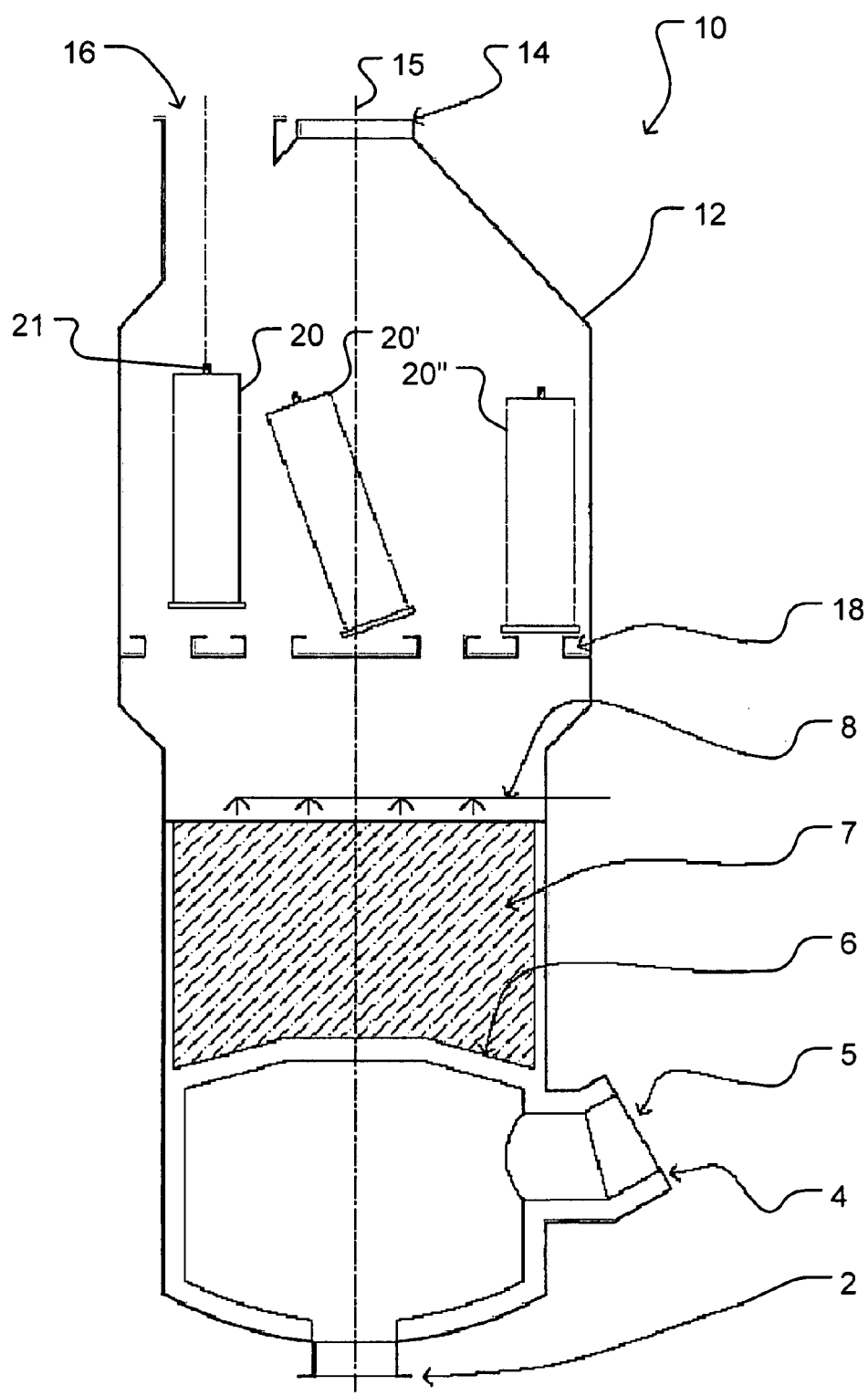
FIG. 1 illustrates a tower with a candle being installed according to the prior art.
Figure 1A:
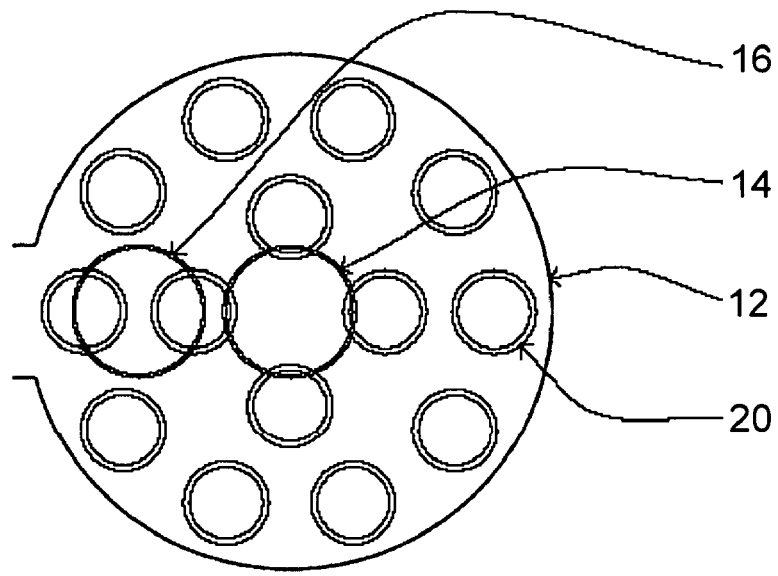
FIG. 1A is a top plan view of the tower of FIG. 1 schematically illustrating an example arrangement of candles in the housing.
Figure 2A:
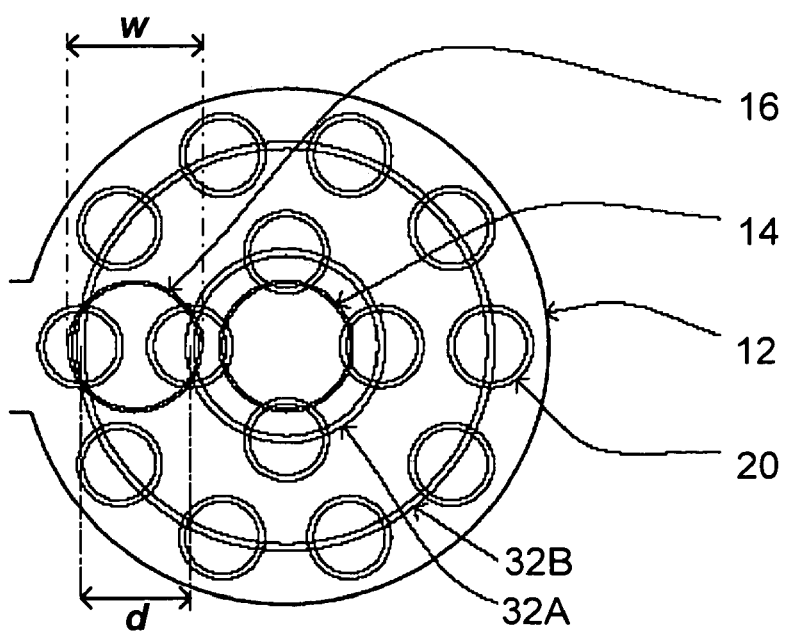
FIG. 2A is a top plan view of the tower of FIG. 2 schematically illustrating an example arrangement of the rails in relation to the candles in the housing; and, FIG. 3 illustrates a traveler assembly of the candle handling apparatus of FIG. 2.
Figure 2:
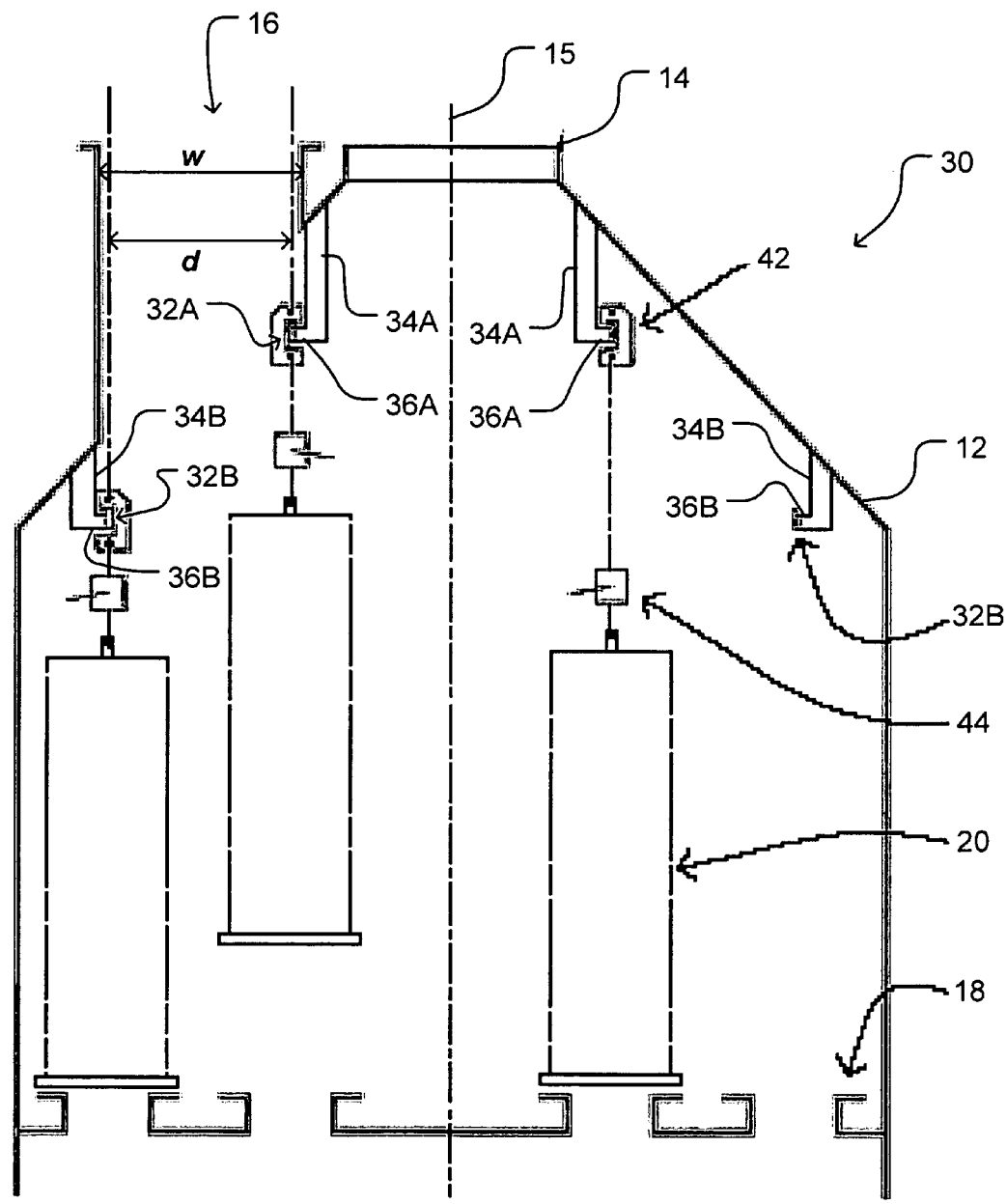
FIG. 2 illustrates an upper portion of a tower with a candle handling apparatus according to one embodiment of the invention.

FIG. 2 illustrates an upper portion of a tower 10 with a candle handling apparatus 30 according to one embodiment of the invention. Candle handling apparatus 30 comprises an inner rail 32A and an outer rail 32B (collectively, rails 32). Rails 32 conform to the shape of the interior of housing 12, and may extend over a plurality of candle locations. In some embodiments, rails 32 extend over the centerlines of each of the candle locations. In the embodiment of FIG. 2, rails 32 are generally circular, as best shown in FIG. 2A. However, as one skilled in the art will appreciate, rails 32 may have different shapes, provided that each rail 32 maintains a generally constant altitude throughout its course. Rails 32 may comprise closed loops, as in the illustrated embodiment, or may have open structures, depending on the configuration of tower 10 and the candle locations. Rails 32 may be constructed from a corrosion-resistant material.

Rails 32A and 32B are attached to the inside of the upper portion of housing 12 by supports 34A and 34B, respectively. Supports 34A each comprise an outwardly extending arm 36A which supports rail 32A. Supports 34B each comprise an inwardly extending arm 36B which supports rail 32B. Supports 34A and 34B extend downwardly from housing 12, but it is to be understood that rails 32 could alternatively be supported by structures extending inwardly from housing 12. The illustrated arrangement facilitates installation and removal of candles 20 in tower 10 by allowing a portion of each of rails 32A and 32B to be located directly below installation port 16, so that candles 20 can be lowered onto either of rails 32, as described below. As one skilled in the art will appreciate, other arrangements are possible to achieve this result, provided that a horizontal separation d of rails 32 below installation port 16 is less than a width w of installation port 16 (see FIG. 2A).

Figure 3:
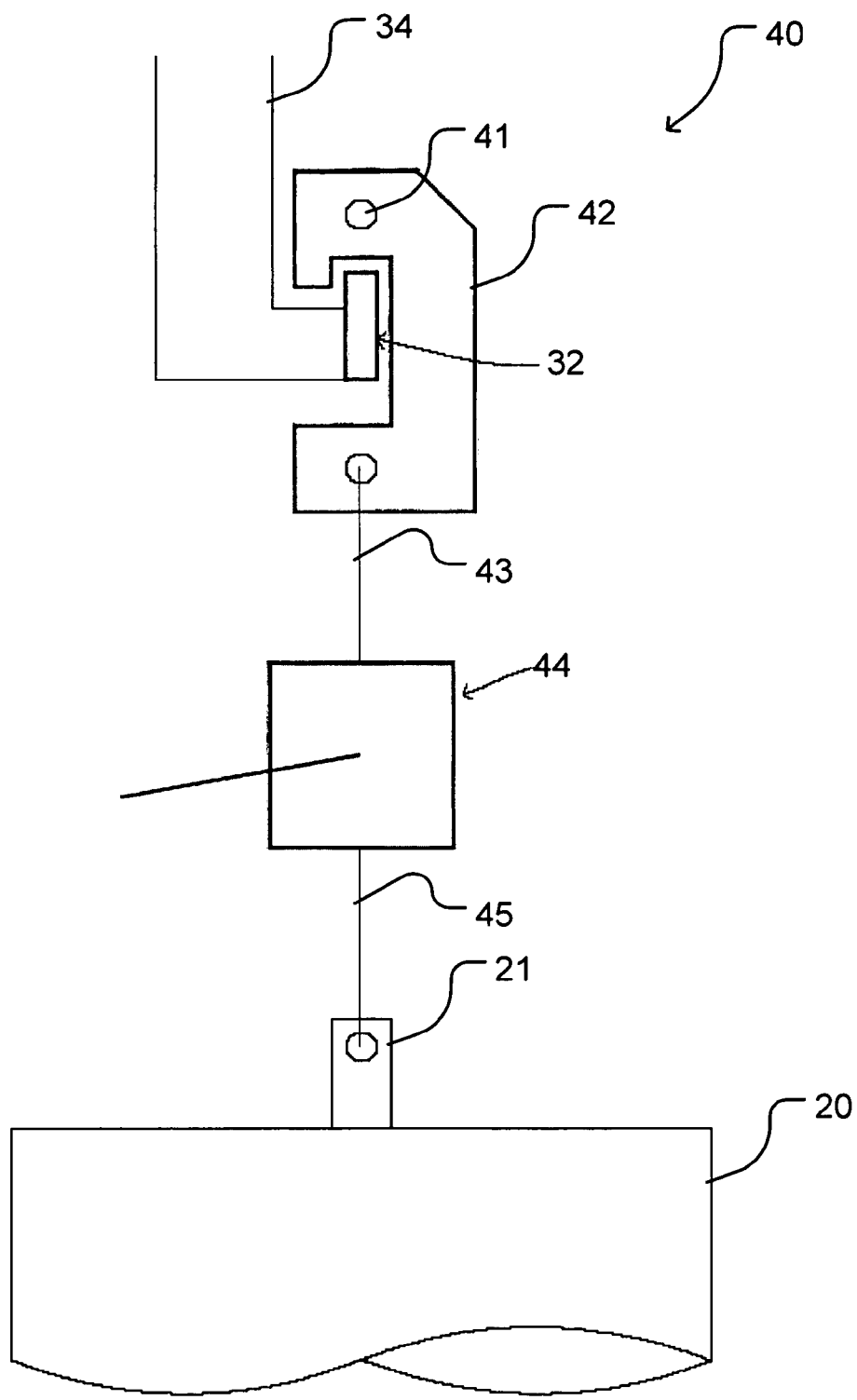

As shown in FIGS. 2 and 3, candle handling apparatus 30 comprises a traveler assembly 40 configured to be removably attached to eyelet 21 of candle 20 for slidably supporting candle 20 from one of rails 32. Traveler assembly 40 comprises a traveler 42 coupled to a hoist puller 44 by means of a cable 43. Traveler 42 has a hole 41 near a top thereof to accommodate a hook of a crane (not shown). Hoist puller 44 is attached to eyelet 21 of candle 20 by means of a cable 45. Hoist puller 44 may comprise means for controllably adjusting the height of candle 20. For example, hoist puller 44 may comprise a winch or the like which adjusts the height of candle 20 by winding and unwinding cable 43 and/or cable 45. Cable 43 may be removably attached to traveler 42 so that hoist puller 44 may be separated from slider 42. Cable 45 may be removably attached to eyelet 21 so that traveler assembly 40 can be disengaged from candle 20 once candle 20 has been maneuvered into position, as described below.

Candles 20 are typically delivered to the vicinity of tower 10 by road or by rail, and are laid horizontally during transport. In order to install a candle 20 in tower 10 by a method according to one aspect of the invention, hoist puller 44 is attached to eyelet 21 of candle 20 by means of cable 45. Traveler 42 is then attached to hoist puller 44 by means of cable 43. Hoist puller 44 is used to adjust the length of cable 43 and/or cable 45 such that candle 20 will be suspended above flanges 18 when supported from one of rails 32, as described below. A crane's hook is then attached to hole 41 of traveler 42, and candle 20 is lifted into a vertical position. Candle 20 is then raised to the top of tower 10 and lowered down though candle installation port 16.

As discussed above, the configuration of installation port 16 and rails 32 is such that the crane can lower traveler 42 onto either rail 32A or rail 32B. Once traveler 42 engages one of rails 32, the crane's hook is disengaged from traveler 42. Candle 20, supported from one of rails 32 by traveler assembly 40, is pushed around so that it lines up with the flange 18 to which it will be bolted. Since rails 32 maintain a generally constant altitude throughout their course, candle 20 and traveler assembly 40 may be pushed along rails 32 with relative ease. Candle 20 is then lowered onto flange 18 using hoist puller 44, and is then bolted or otherwise secured to flange 18.

Once candle 20 is secured to flange 18, traveler assembly 40 is removed from candle 20 be detaching cable 45 from eyelet 21. Traveler assembly 40 is then removed from tower 10 and the above procedure is repeated until all of candles 20 are installed. The procedure is reversed for removal of candles 20. In some embodiments, traveler assembly 40 may be constructed from a corrosion-resistant material, such that traveler assembly 40 may be left in tower 10 once all candles 20 have been installed.

As will be apparent to those skilled in the art in the light of the foregoing disclosure, many alterations and modifications are possible in the practice of this invention without departing from the spirit or scope thereof. For example, while the illustrated embodiment has two rails, the invention could be practiced with only one rail installed in the tower. Also, although the drawings illustrate candles standing on top of flanges, candles are sometimes designed with a mounting ring located at the upper end of the candle. Such candles extend downward through the flanges into a compartment below the flange. During installation, the mounting ring is bolted to the flange. The present invention is equally suitable for installing candles which hang from their flanges in this manner.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus for manipulating a contacting device in a tower having a housing with a support therein for supporting the contacting device, the housing defining an installation port in an upper portion thereof and sized to allow the contacting device to pass therethrough, the apparatus comprising:

at least one rail attached on an inside of the upper portion of the housing, the at least one rail positioned such that a portion thereof is located directly below a portion of the installation port; and, a traveler assembly for suspending the contacting device, the traveler assembly configured to slidably engage the at least one rail and comprising means for adjusting a length thereof such that the contacting device may be lowered onto and raised up off the support wherein the traveler assembly comprises a traveler for engaging the at least one rail, and the means for adjusting the length of the traveler assembly comprises a hoist puller suspended from the traveler by a first cable.

2. An apparatus according to claim 1 wherein the at least one rail comprises an inner rail and an outer rail, the inner rail and outer rail each positioned such that a portion thereof is located directly below a portion of the installation port.

3. An apparatus according to claim 1 comprising a second cable suspended from the hoist puller for releasably engaging the contacting device.

4. An apparatus according to claim 3 wherein the means for adjusting the length of the traveler assembly comprises a winch for winding at least one of the first cable and the second cable.

5. An apparatus according to claim 1 wherein the traveler defines a hole in an upper portion thereof for receiving a hook of a crane.

6. An apparatus according to claim 1 wherein the at least one rail extends over a plurality of candle locations on the support.

7. An apparatus according to claim 6 wherein the at least one rail extends over a centerline of each of the plurality of candle locations.

8. An apparatus according to claim 1 wherein the at least one rail forms a closed loop within the housing.

9. An apparatus according to claim 1 wherein the traveler assembly is removable from the at least one rail.

10. An apparatus according to claim 1 wherein the traveler assembly is removable from the contacting device.

11. An apparatus according to claim 1 wherein the at least one rail is constructed from a corrosion-resistant material.

12. An apparatus according to claim 1 wherein the traveler assembly is constructed from a corrosion-resistant material.

13. An apparatus according to claim 1 wherein the tower comprises a sulfuric acid absorption or drying tower.

14. An apparatus according to claim 1 wherein the tower comprises a chemical process tower.

15. An apparatus according to claim 1 wherein the contacting device comprises a candle.

* * * * *